United States Patent [19]

Crick

[11] Patent Number: 5,353,168

[45] Date of Patent: Oct. 4, 1994

[54] RECORDING AND REPRODUCING SYSTEM USING TIME DIVISION MULTIPLEXING

[75] Inventor: Neil M. Crick, Hampshire, United Kingdom

[73] Assignee: Racal Recorders Limited, Berkshire, United Kingdom

[21] Appl. No.: 972,080

[22] Filed: Nov. 5, 1992

Related U.S. Application Data

[63] Continuation of Ser. No. 599,843, Oct. 18, 1990, abandoned.

[30] Foreign Application Priority Data

Jan. 3, 1990 [GB] United Kingdom ............. 9000105.8

[51] Int. Cl.$^5$ .................... G11B 5/00; G11B 5/02; G11B 15/12

[52] U.S. Cl. ........................ 360/5; 360/18; 360/61

[58] Field of Search .............. 360/18, 27, 61, 65, 360/68, 19.1, 64, 5, 6, 63

[56] References Cited

U.S. PATENT DOCUMENTS

| | | | |
|---|---|---|---|
| 3,889,293 | 6/1975 | Muraco et al. | 360/18 |
| 4,575,773 | 3/1986 | Dymond et al. | 360/32 |
| 4,688,115 | 8/1987 | Takahashi et al. | 360/64 |
| 4,709,275 | 11/1987 | Fukuda | 360/19.1 |
| 4,807,056 | 2/1989 | Sasaki et al. | 360/27 |
| 5,036,409 | 7/1991 | Kaaden et al. | 360/61 |

FOREIGN PATENT DOCUMENTS

| | | |
|---|---|---|
| 101301 | 2/1984 | European Pat. Off. |
| 59-188878 | 10/1984 | Japan |
| 60-59503 | 4/1985 | Japan |
| 60-133570 | 7/1985 | Japan |
| WO82/01971 | 6/1982 | PCT Int'l Appl. |
| 2098376A | 11/1982 | United Kingdom |

OTHER PUBLICATIONS

"Disc, DAT and De OTHER" Broadcast Systems Engineering Jan. 1988 pp. 45–52.

"The Complete Handbook of Magnetic Recording" by Finn Jorgensen, Tab Books Inc. pp. 152–155 1980.

Primary Examiner—Donald Hajec
Assistant Examiner—Won Tae C. Kim
Attorney, Agent, or Firm—Leydig, Voit & Mayer

[57] ABSTRACT

A system for recording analogue and/or digital signals (especially analogue voice signals) on magnetic tape has a plurality of individual input channels and a time division multiplexing circuit which samples the analogue signals in the input channels cyclically, in a pre-arranged sequence. The samples are output to a single output channel for recording on a standard VHS magnetic tape. In the replay mode, recorded signals are distributed to respective output channels by a demultiplexing circuit.

3 Claims, 6 Drawing Sheets

RECORDING AND REPRODUCING SYSTEM USING TIME DIVISION MULTIPLEXING

This is a continuation of copending application Ser. No. 07/599,843 filed on Oct. 18, 1990, now abandoned.

BACKGROUND OF THE INVENTION

This invention relates to a recording system, and particularly to a multi-channel recording system used to record analogue and/or digital signals.

The invention has particular, though not exclusive, application to such multi-channel recording systems as are used to record analogue voice signals derived, for example, from air and ground controllers in airports.

In a known multi-channel recording system, analogue input signals are converted to digital signals and then subjected to digital processing prior to recording. During the replay mode, the recorded digital signals need to be converted back to analogue signals. A multi-channel digital recording system of this kind tends to be both expensive and complex to implement.

In another multi-channel arrangement, the input signals in each input channel could be recorded directly using a respective, linear record head. Again, however, this approach tends to be prohibitively expensive.

SUMMARY OF THE INVENTION

According to the present invention, there is provided a recording system comprising, a plurality of individual input channels for receiving analogue and/or digital signals, time division multiplexing means for sampling the signals in the input channels cyclically, in a predetermined sequence, and means for recording the resultant sequence of samples, as an analogue signal, in a recording medium.

This recording system has the advantage that it requires one channel only for recording, and yet does not suffer from the afore-mentioned disadvantages.

According to a further aspect of the invention, there is provided a recording system comprising,
a plurality of individual input channels for receiving analogue and/or digital signals, one of the input channels being arranged to receive synchronisation signals,
time division multiplexing means for sampling the signals in the input channels cyclically, in a predetermined sequence, a said synchronisation signal being sampled at the start of each sampling cycle,
modulation means for subjecting the resultant sequence of samples to frequency modulation,
a record head for recording the sequence of frequency modulated samples in a magnetic recording medium,
a read head for reading a said sequence of frequency modulated samples recorded in a said magnetic recording medium,
means for demodulating the frequency modulated samples output by the read head,
means for detecting said synchronisation signals in the frequency demodulated samples,
a plurality of output channels each corresponding to a respective input channel, and
time division de-multiplexing means, responsive to said synchronisation signals detected by the detection means, for distributing the frequency demodulated samples to respective ones of the output channels.

According to a yet further aspect of the invention, there is provided a method of recording a plurality of analogue and/or digital signals comprising the steps of, subjecting the signals to time division multiplexing whereby to sample the signals cyclically, in a predetermined sequence, and recording the resultant sequence of samples as an analogue signal in a recording medium.

BRIEF DESCRIPTION OF THE DRAWINGS

Recording systems embodying the invention are now described, by way of example only, with reference to the accompanying drawings, in which.

DESCRIPTION OF PREFERRED EMBODIMENTS

The recording system which is to be described is intended primarily for voice logging, enabling several independent analogue voice signals, derived from different sources, to be recorded on the same magnetic tape.

In this particular embodiment the magnetic tape is in the form of a standard VHS cassette.

Each independent analogue voice signal is received in a respective channel of the recording system. The received signals are sampled cyclically using a time division multiplexing technique, and the resultant sequence of samples is then recorded on the magnetic tape as an analogue signal.

Figure 1:
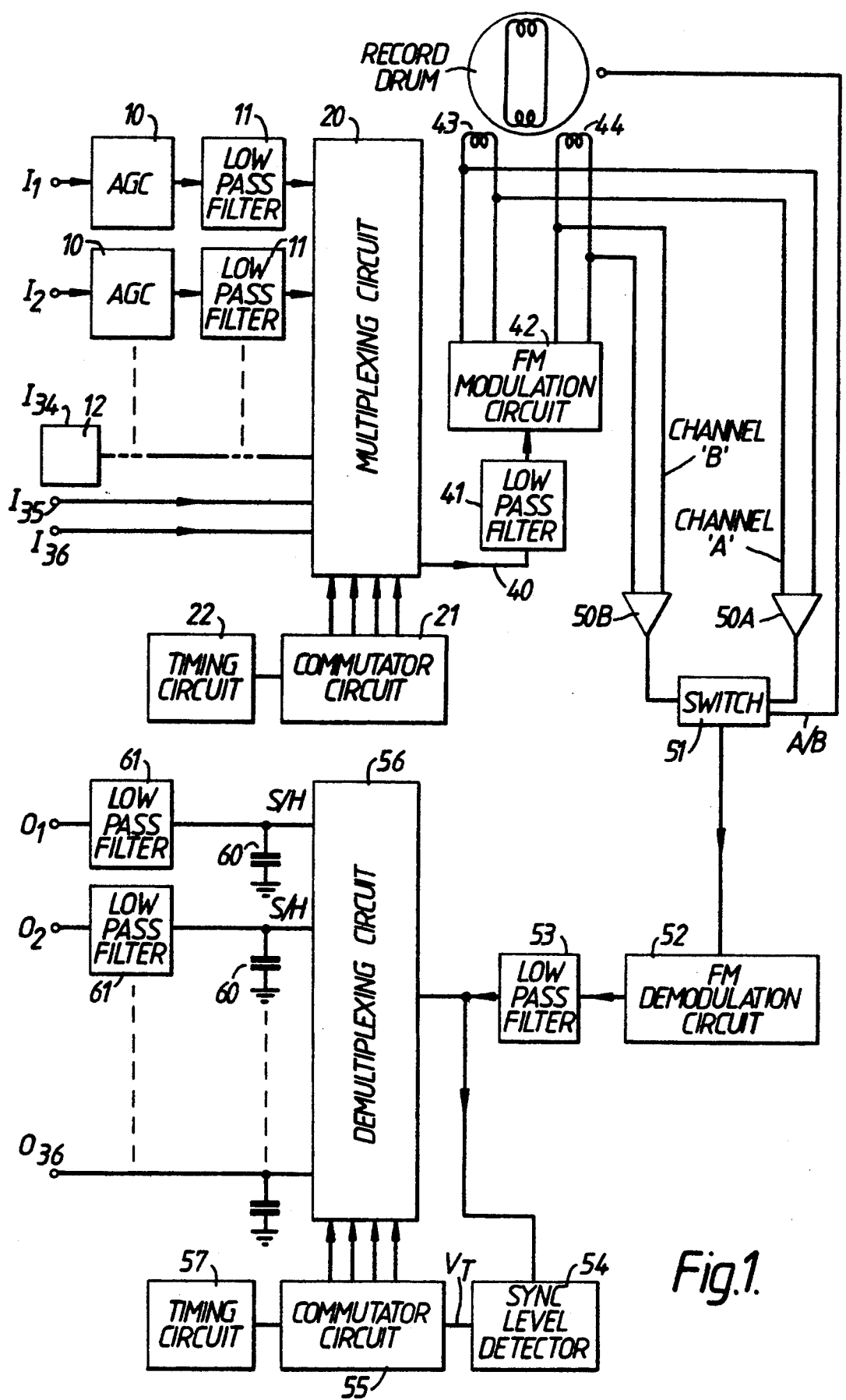
FIG. 1 shows a block circuit diagram of one embodiment of the recording system.

In this embodiment, the recording system has thirty six discrete input channels. As shown in FIG. 1, thirty two of these channels, $I_1, I_2 \ldots I_{32}$, are available to receive analogue voice signals, another channel $I_{36}$ receives a synchronisation signal, in the form of a fixed voltage level, and the three remaining input channels $I_{33}$, $I_{34}$ and $I_{35}$ enable ancillary functions to be performed, as will be described hereinafter.

Each voice input channel $I_1, I_2 \ldots I_{32}$ comprises the series arrangement of an automatic gain control (AGC) circuit 10 and a low pass filter 11, and is connected to a respective input terminal of a time division multiplexing circuit 20 (a 74 HC 4051).

The low pass filters 11 are so chosen that the recording system has a desired frequency response which, in this embodiment, is in the frequency range from 300 Hz to 3.4 kHz, the frequency range normally associated with voice signals.

The automatic gain control circuits 10 exercise control over the amplitudes of the analogue voice signals supplied to the multiplexing circuit 20, being effective to confine the input voltage levels to a range of voltage bounded by an upper voltage level of +1 volt and a lower voltage level of −1 volt. The synchronisation signal, on the other hand, which is supplied to the multiplexing circuit 20 via input channel $I_{36}$, has a fixed voltage level which lies outside the afore-mentioned voltage range and which, in this embodiment, is set at $-2$ volts. In this way, the synchronsation signal in channel $I_{36}$ is readily distinguishable from all the other input signals in channels $I_1, I_2 \ldots I_{35}$.

A commutator circuit 21 receives clock pulses from a timing circuit 22 and, in response thereto, causes the multiplexing circuit 20 to sample the analogue signals in the input channels cyclically, in a pre-arranged sequence. By this means, the voltage level in each channel is sampled once every 125 $\mu$sec for a respective sampling period lasting 3.5 $\mu$sec. The sampled voltage levels are output to a single output channel 40.

Figure 2:
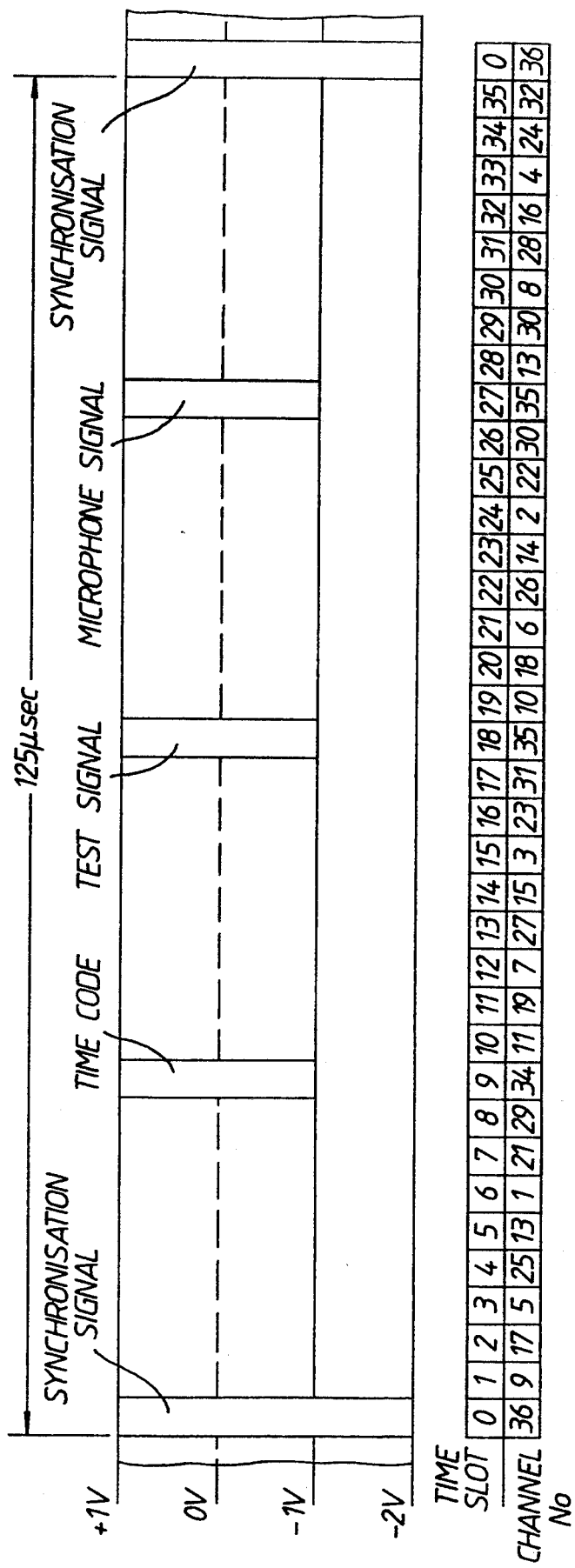
FIG. 2 shows the multiplexing format employed in the recording system of FIG. 1.

FIG. 2 illustrates the multiplexing format for one complete sampling cycle (hereinafter referred to as a "frame") lasting 125 $\mu$sec. The first input channel to be sampled (during time slot "0") is channel $I_{36}$ containing the synchronisation signal, giving rise to a voltage level of $-2$ volts in the output channel 40, as shown in FIG. 2. Input channels $I_1, I_2 \ldots I_{35}$ are then sampled during successive time slots (designated "1" to "35") in the pre-arranged sequence indicated by the channel numbers (1-35) in FIG. 2.

In each case, the voltage level which is output to channel 40 represents the voltage level prevailing in the respective input channel during the relevant sampling period. Thus, for example, if an input channel ($I_{25}$, say) contains no analogue voice signal, the voltage level supplied to output channel 40 during the corresponding time slots (designated 4 in this case) would be 0 volts.

In effect, therefore, each voltage level in channel 40 represents a "snap-shot" of an analogue signal in the corresponding input channel during the respective sampling period.

The input signals in channels $I_{33}, I_{34}$ and $I_{35}$ consist of logic levels (either $+1$ volt or $-1$ volt) which comprise part of a time code signal, a test signal and a microphone signal respectively.

The time code signals, derived from a succession of sampling cycles, represent the actual time a recording was made and, similarly, the test signals and the microphone signals represent respectively, test data, which can be input to channel $I_{35}$, and an audio message which can be recorded by an operator, as desired, via a microphone input 12 to channel $I_{34}$.

The sequence of voltage levels in channel 40 is supplied to a further low pass filter 41 which removes high frequency components lying outside the desired frequency range.

The filtered signals are then passed to an FM modulation circuit 42 wherein they modulate a carrier signal preparatory to being recorded on magnetic tape.

In this embodiment, the modulated carrier signal is supplied simultaneously to a pair of record heads 43,44 forming part of a helical scan recording unit.

Figure 3:
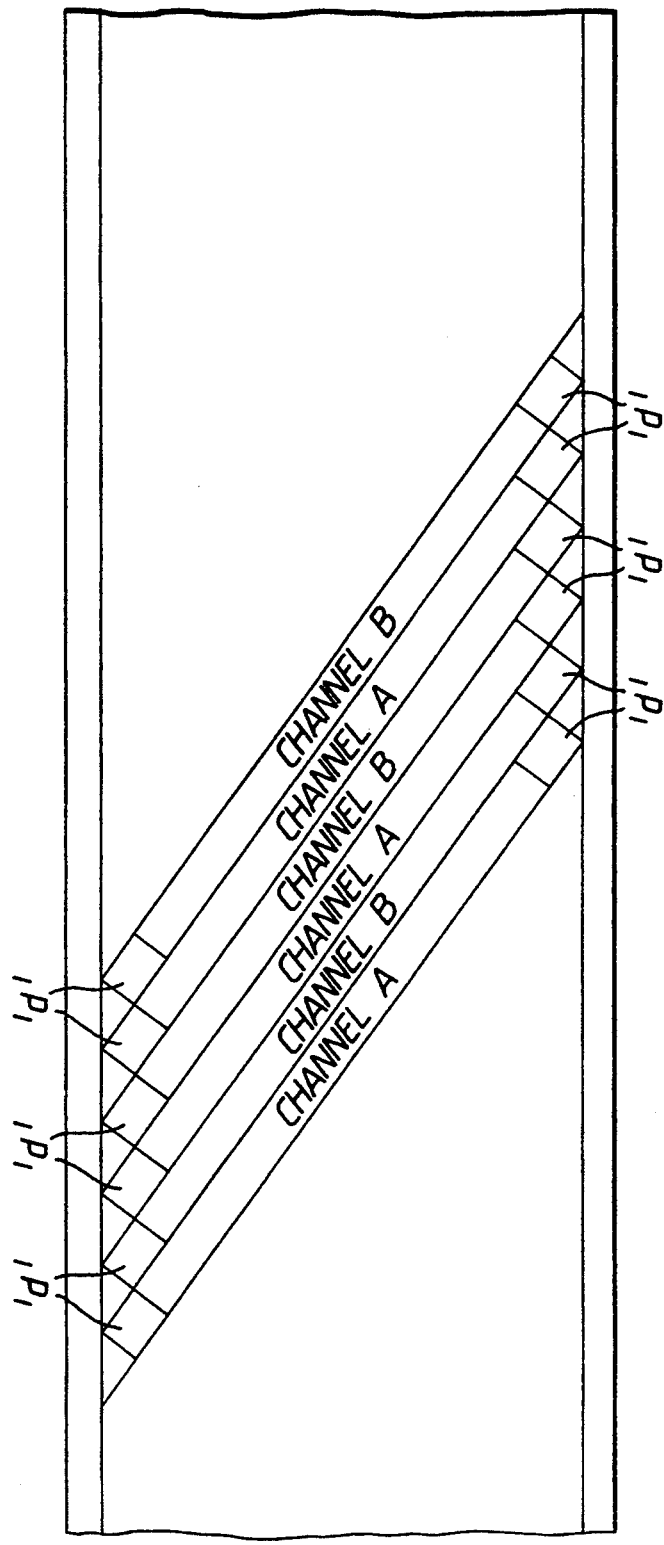
FIG. 3 illustrates successive swipes recorded on magnetic tape by the system of FIG. 1.

As in the helical scan arrangements used to record video signals on magnetic tape, the two record heads are mounted 180° apart at the circumference of a rotating drum relative to which the tape is transported. The two heads record tracks or swipes alternately. The swipes extend diagonally across the tape, as shown in FIG. 3, the swipes recorded by one of the heads (43, say) being denoted as "channel A" swipes and the swipes recorded by the other head (44) being denoted as "channel B" swipes, interlaced with the channel A swipes. Each swipe contains 512 frames (lasting 64 ms). However, as will be explained with reference to FIGS. 4a and 4b, additional frames are recorded at the ends of each swipe.

In order to extend the available recording time, the tape transport mechanism operates at a much lower speed than is used to record video signals and, in this way, it is possible to record continuously for 25 hours using a conventional E240 VHS (i.e. 8 hour) tape.

As will be seen from FIG. 2, neighbouring input channels (e.g. channels 1,2; 3,4; etc.) occupy time slots (6,24; 15,33) which are separated in time by half the sampling period i.e. 62.5 $\mu$sec. Accordingly, therefore, by connecting such neighbouring channels in parallel it is possible to sample an analogue input signal at twice the normal rate, thereby enabling the bandwidth for the connected channels to be doubled.

In the replay mode, the same (or alternatively different) heads may be used to read the recorded signals. In the embodiment of FIG. 1, head 43 is used to read the 'channel A' swipes and head 44 is used to read the 'channel B' swipes. The output of each head 43,44 is connected to an FM demodulator circuit 52 via a respective preamplifier/equalizer circuit 50A,50B and a common switch circuit 51. The switch circuit is controlled by a channel selection signal A/B from the drum and is effective to route the channel A signals (produced at the output of head 43) and the channel B signals (produced at the output of head 44) alternately to the FM demodulation circuit 52.

The output of the demodulator circuit 52 is connected to a low pass filter 53, and a synchronisation level detection circuit 54 compares the amplitudes of the filtered signals with a suitable threshold level (set between $-1$ volt and $-2$ volts) whereby to detect the synchronisation signal which marks the start of each new frame (time slot "0" in FIG. 2). Each time a synchronisation signal is detected, the detection circuit 54 generates a trigger signal $V_T$ effective to initialise a commutator circuit 55 associated with a time division de-multiplexing circuit 56. The commutator circuit 55 receives clock signals from a timing circuit 57 and, in response thereto, causes the de-multiplexing circuit 56 to distribute, in the correct sequence, the voltage levels (in time slots 1 to 35) which follow the synchronisation signal to respective ones of a plurality of output channels $O_1, O_2 \ldots O_{36}$, each corresponding to a respective input channel $I_1, I_2 \ldots I_{36}$, whereby to reproduce the recorded signals. Each output channel comprises the series arrangement of a sample and hold (S/H) circuit 60 and a low pass filter 61.

Although the record/replay heads for channels A and B are spaced 180° apart on the drum, the length of tape in contact with the drum subtends a somewhat larger angle, typically 200°. A consequence of this is that signals recorded at one end of a swipe (a channel A swipe, say) will also be recorded at the beginning of the immediately succeeding swipe (a channel B swipe). The regions in each swipe where such duplication occurs are referenced 'd' in FIG. 3.

Such duplication of the recorded signals would not cause a problem provided corresponding synchronisation signals in the two channels are read simultaneously. However, in practice, the alignment of the heads in an apparatus used for the record mode could (and probably would) differ slightly from the alignment of heads in a different apparatus used for the replay mode. In such circumstances, the synchronisation signals derived from swipes recorded in one channel would be shifted in time relative to the corresponding synchronisation signals derived from swipes recorded in the other channel, and this would lead to instantaneous time disruptions of the replayed signals. Tape stretch, which is particularly sensitive to humidity and also temperature, could also give rise to the same problem.

Figure 4:
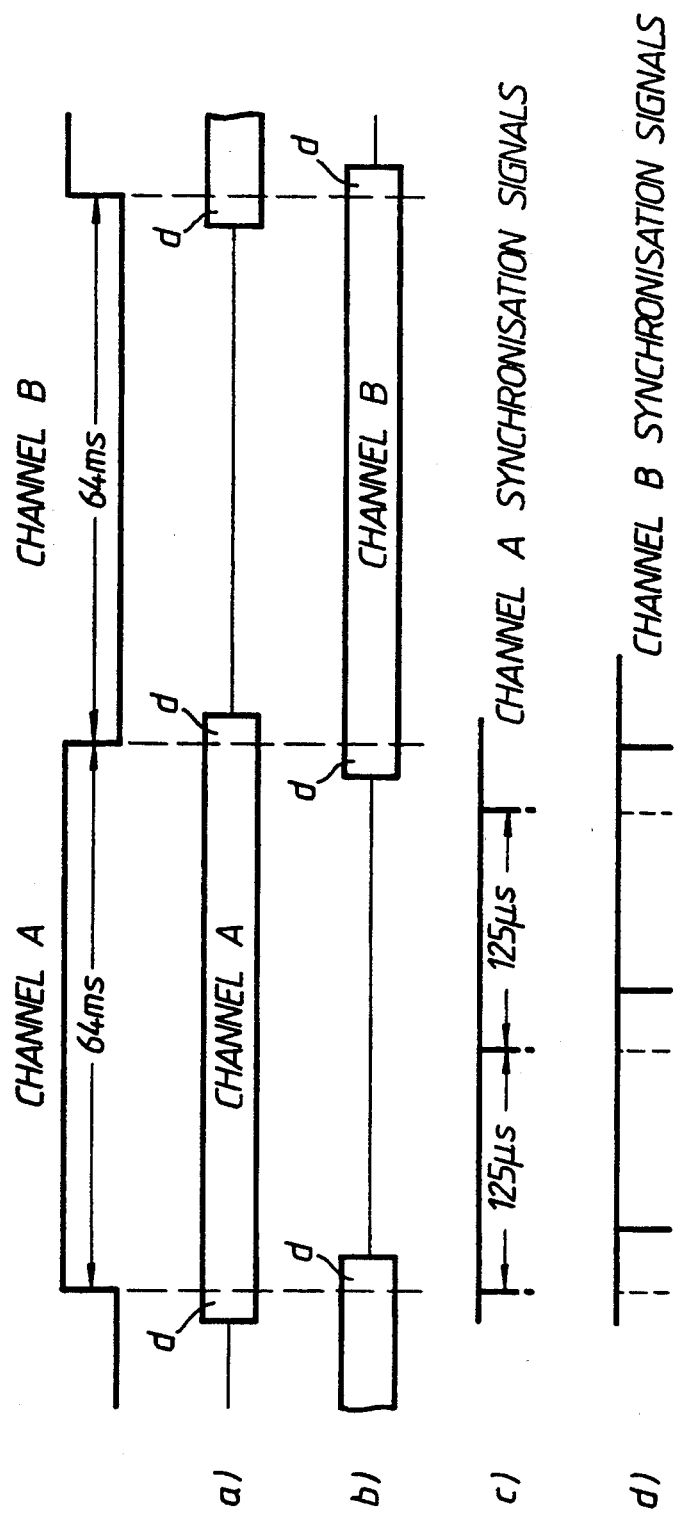
FIG. 4 illustrates the relative timing of synchronisation signals in respective channels of the recording.

This shift in the relative timings of synchronisation signals is illustrated in FIG. 4.

FIGS. 4(a) and 4(b) illustrate diagrammatically the variations in time of the envelopes of signals recorded in successive swipes and, as before, the regions where duplication occurs are referenced 'd'.

FIGS. 4(c) and 4(d) illustrated, on an expanded time scale, the relative timing of corresponding synchronisation signals derived from regions referenced 'd' in FIGS. 4(a) and 4(b) respectively. As will be clear from these Figures, the synchronisation signals derived from the channel B swipe are shifted in time relative to the corresponding synchronisation signals derived from the channel A swipe. It will be appreciated that the synchronisation signals derived from one swipe (in channel A, say) could either precede or succeed in time the corresponding synchronisation signals derived from the adjacent swipe (in channel B).

If the recording consists of audio signals such instantaneous time disruptions, although undesirable, could perhaps be tolerated. However, in the case of a recording of which each sample represents data (a recording of modem data, for example) the afore-mentioned time disruptions would compromise the operational integrity of the recording system.

Figure 5A:
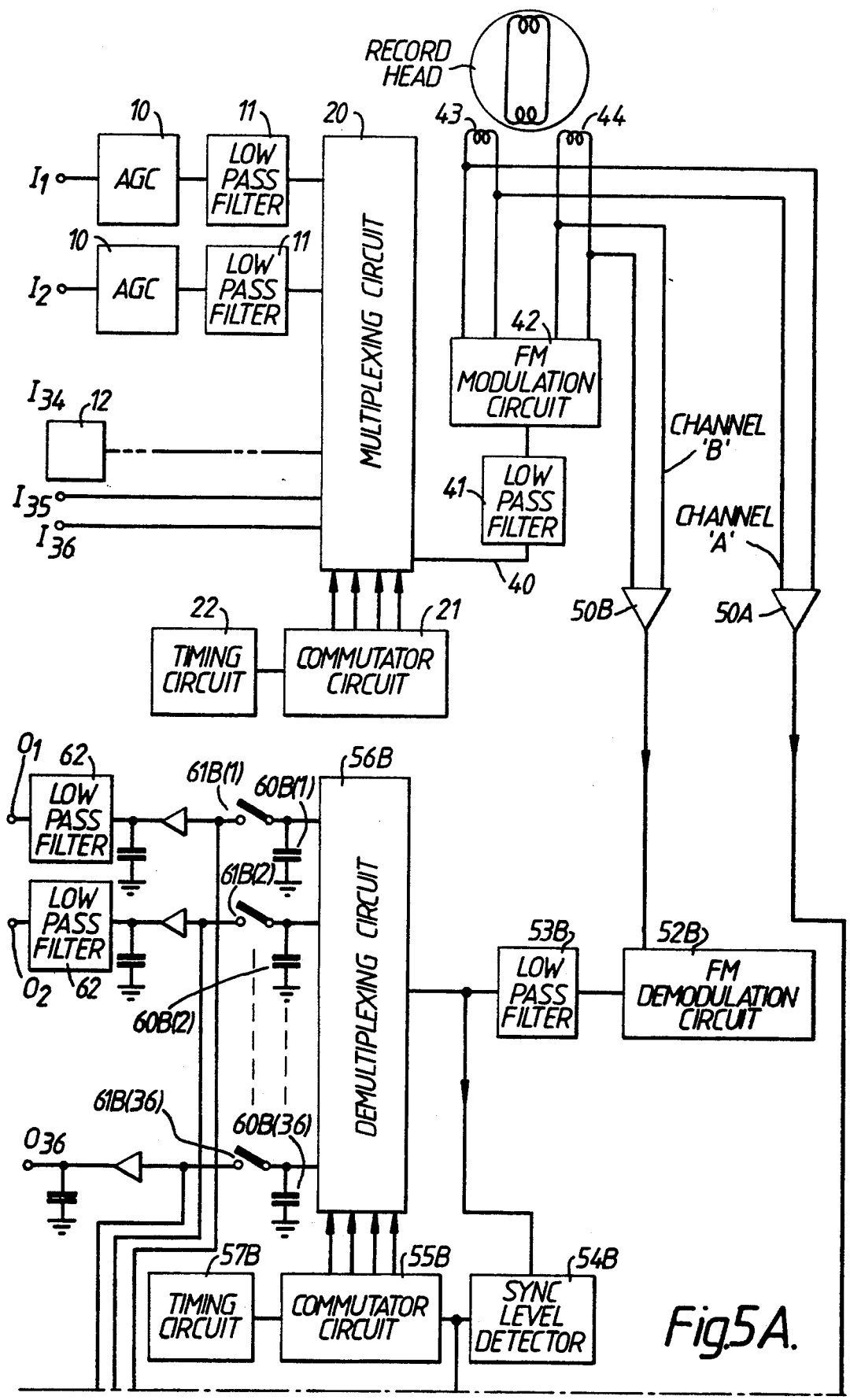
FIG. 5A shows one part of a block circuit diagram of a further embodiment of the recording system.
Figure 5B:
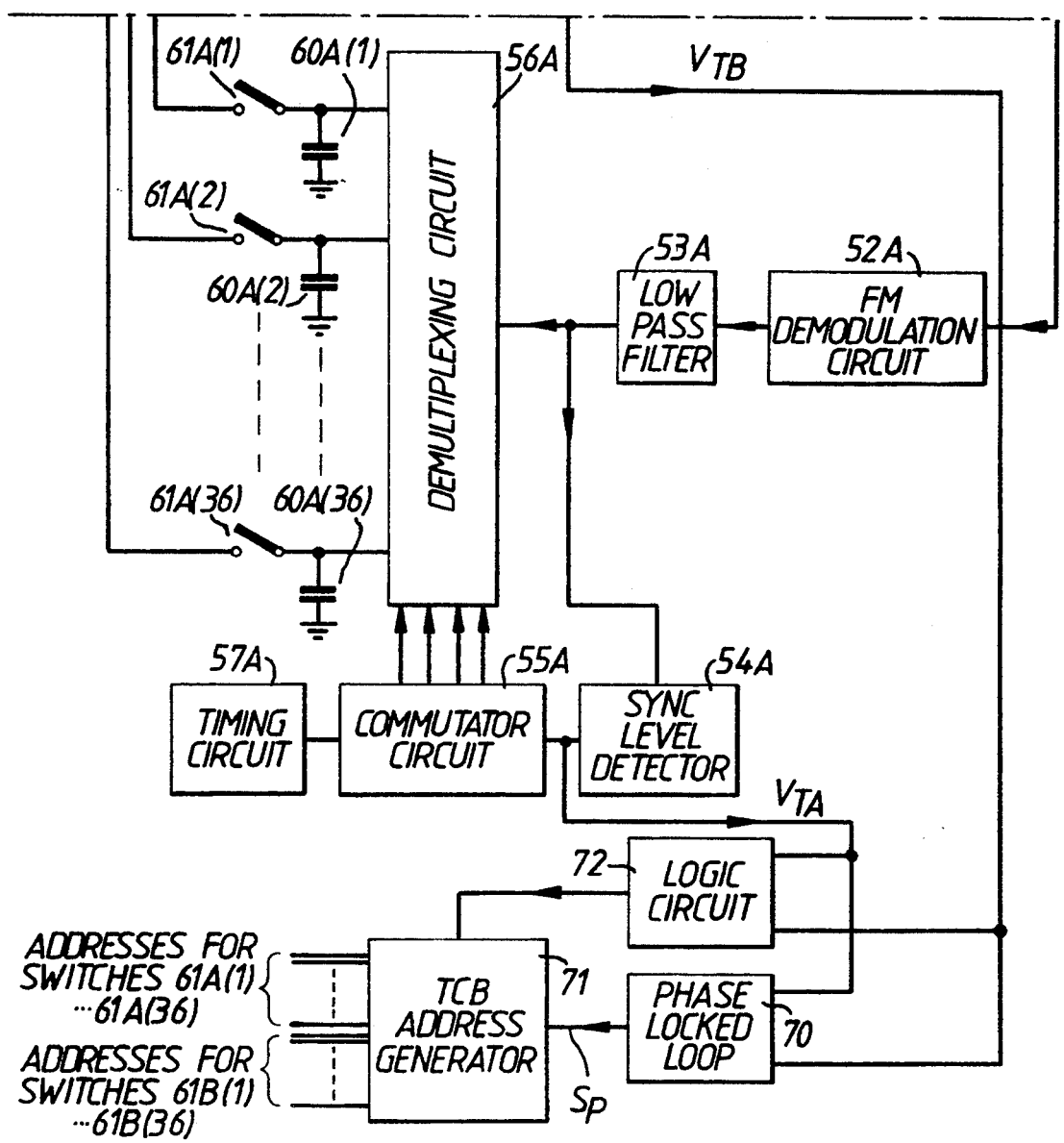
FIG. 5B shows another part of the block circuit diagram of the further embodiment of the recording system.

With a view to alleviating this problem, the recording system shown in FIGS. 5A and 5B incorporates a modification of the system of FIG. 1. Some of the components used in the modified system are identical to those used in the system of FIG. 1, and these have been ascribed like reference numerals.

The modified system incorporates a phase-locked loop which, in effect, averages over time the synchronisation signals derived from both the channel A and the channel B swipes and generates a new sequence of psuedo synchronisation signals. These psuedo synchronisation signals are used to control the relative timings of the demultiplexed signals output from both channels of the recording system in order to remove any instantaneous time disruptions that may be present.

Referring again to FIG. 5, in the relay mode, the channel A/channel B output signals are demodulated and demultiplexed separately. To that end, the output signals from each read head 43,44 are routed via a respective pre-amplifier/equaliser circuit 50A,50B to a respective FM demodulation circuit 52A,52B. The output of each demodulation circuit is connected to a respective low pass filter 53A,53B and a respective synchronisation level detection circuit 54A,54B compares the amplitudes of the filtered signals with a suitable threshold level (between −1 volt and −2 volts) whereby to detect the synchronistion signals which mark the start of each new frame in the respective channel. Each time a synchronisation signal is detected, the detection circuit 54A,54B generates a trigger signal $V_{TA}, V_{TB}$ effective to initialise a respective commutator circuit 55A,55B. The commutator circuits receive clock signals from respective timing circuits 57A,57B and, in response thereto, cause associated time division de-multiplexing circuits 56A,56B to distribute the voltage levels (in time slots 1 to 35) which follow each detected synchronisation signal to respective sample and hold circuits 60A(1), 60A(2) ... 60A(36); 60B(1), 60B(2) ... 60B(36) associated with the output channels $O_1, O_2 ... O_{36}$.

The trigger signals $V_{TA}, V_{TB}$ from both channels are supplied to a phase-locked loop 70 which, as explained, effectively averages the synchronisation signals detected in channels A and B and generates a new sequence of psuedo synchronisation signals Sp. These signals are supplied to a time base correction (TCB) address generator 71 which generates 72 TCB addresses, each controlling the state of a respective switch 61A(1), 61A(2) ... 61A(36); 61B(1), 61B(2) ... 61B(36) connected in series with a respective one of the sample and hold circuits.

The relative timings of the psuedo synchronisation signals, and so of the TCB addresses, are such that any instantaneous time disruptions which may have been present in the demultiplexed signals are removed before the signals are output from channels $O_1, O_2 ... O_{36}$ via the switches and respective low pass filters 62.

A logic circuit 72 is provided to recognise the first few (typically two) synchronisation pulses in each swipe and to cause the address generator 71 to switch from one bank of addresses, appropriate for the current swipe (a channel A swipe, say) to the other bank of addresses, appropriate for the next swipe (a channel B swipe). The logic circuit is also arranged to ignore any remaining synchronisation pulses in the current swipe so as to prevent the address generator from switching back prematurely.

It will be appreciated that although the embodiment described has particular application in recording analogue voice signals (e.g. to monitor the conversations of air and ground controllers in airports), the invention has much wider applicability than this, and can be used, for example, to record analogue and/or digital data signals.

I claim:

1. A recording and reproducing system comprising,
    a plurality of individual input channels for receiving respective input signals having respective levels;
    time division multiplexing means for sampling the respective input signals cyclically, according to a predetermined sequence of the input channels and for outputting a succession of samples occupying respective time slots, each sample representing a level of an input signal received in a respective input channel during a respective time slot, the samples derived from one of the input channels being used as synchronisation signals;
    frequency modulation means for frequency modulating the succession of samples output by said time division multiplexing means to produce frequency-modulated samples;
    means for recording the frequency-modulated samples, as an analogue signal, on magnetic recording tape;
    means for reading the frequency-modulated samples from the magnetic recording tape;
    frequency demodulation means for demodulating the frequency modulated samples read by the reading means to produce a succession of frequency-demodulated samples,
    a plurality of output channels, each output channel corresponding to a respective input channel;
    time division demultiplexing means for distributing the frequency-demodulated samples output by said frequency-demodulation means to respective output channels; and
    synchronisation signal detection means for detecting the frequency-demodulated samples that are used as synchronisation signals, the time division demultiplexing distributing the frequency-demodulated samples output by said frequency demodulation means to respective output channels in accordance with the timing of the detected synchronisation signals.

2. A recording and reproducing system as claimed in claim 1, wherein at least some of the input channels include a low pass filter responsive to frequencies in a range from 300 Hz to 3.4 kHz.

3. A recording and reproducing system as claimed in claim 2, wherein said time division multiplexing means has a sampling cycle of predetermined period, and the time division multiplexing means samples the input signals received in physically neighbouring said input channels at respective times during each sampling cycle that are separated in time by half said predetermined period.

* * * * *